Oct. 31, 1967

P. MUIJE ET AL 3,349,469

METHOD OF MAKING LAMINATED SHEET

Original Filed May 8, 1957

INVENTORS
PIETER MUIJE
WILLIAM R. MOHONDRO
MAURICE C. FETZER

ATTORNEY

United States Patent Office 3,349,469
Patented Oct. 31, 1967

3,349,469
METHOD OF MAKING LAMINATED SHEET
Pieter Muije, William R. Mohondro, and Maurice C. Fetzer, Spokane, Wash., assignors to Kaiser Aluminum and Chemical Corporation, Oakland, Calif., a corporation of Delaware
Original application May 8, 1957, Ser. No. 657,959, now Patent No. 3,167,405, dated Jan. 26, 1965. Divided and this application May 8, 1964, Ser. No. 365,961
5 Claims. (Cl. 29—487)

This invention relates generally to a laminated metal sheet and a method for producing the sheet. More particularly, the invention relates to a laminated sheet having a core of zinciferous material and outer layers of aluminous material and to a method for producing this sheet and inflating a desired tube configuration between said aluminous sheet layers.

This application is a division of our copending patent application Ser. No. 657,959, filed May 8, 1957, and now issued as Patent No. 3,167,405.

Various methods have been devised in the past for fabricating heat exchanging devices, such as refrigerator evaporators and certain structural members wherein said devices and memebrs are comprised of multiple layers of sheet metal and wherein bulged or tubed portions are disposed between the sheets to permit the passage of fluids and/or strengthen the fabricated member. Joining a flat sheet to a corrugated sheet or joining multiple corrugated sheets has been used to fabricate a laminated structure having a bulged or tubed portion. The joining may be by any suitable means such as welding, soldering, brazing, or riveting. Also, a common method of manufacturing a heat exchange device, such as a refrigerator evaporator, has been to join, by brazing tubing to sheet material.

These methods of fabrication have several attendant disadvantages, chief among which is that they involve multiple processing steps thereby not being readily amenable to mass production. Also, the joint formed between the multiple sheets is frequently imperfect and the sheets may separate when a stress is applied. With the structures made by welding, soldering and brazing, voids may be present between the sheets at areas other than those of the passageways or bulged portions thereby resulting in lower strength and in leaks in the case of heat exchanger devices.

In recent years a method combining the art of silk

In the drawings:

screen printing and the technique of roll bonding metals has been developed to produce tubing that is integral with a sheet. This method has found substantial use in the heat exchange field, particularly in the making of refrigerator evaporators. In this process a pattern of the tube passageways is applied onto an aluminum sheet using a stop-weld material in the pattern area. A second sheet of aluminum metal is then placed face to face with the first sheet to form a sandwich after which the metal sandwich is heated and rolled. Hot rolling produces a complete bond, and subsequent cold rolling reduces the laminated sheet of metal to the proper thickness. By this method any pattern that can be drawn on a piece of paper can be reproduced as tubing within a laminated sheet structure. Complicated parallel or multiple tubes or passageways running at right angles to each other in two or more layers can be produced.

After rolling, the laminated sheet is annealed to homogenize the bonded structure throughout the material except where the stop-weld pattern has been applied. Subsequent to annealing, one end of the elongated metal sheet is trimmed to lay bare the lead-in end of the stop-weld pattern. A hollow needle is inserted into the bared end of the stop-weld pattern. The laminated sheet is then placed between platens in a hydraulic press and hydraulic pressure is applied, through the hollow needle, to inflate the non-weld design. Areas where the stop-welding has been applied become tubes or passages which are integral with the laminated sheet.

The elongation of the metal sandwich during the rolling steps must be allowed for in the shape and dimension of the pattern of separation material originally applied to the sheet. This leads to one of the principal disadvantages of this method. It is difficult to predict with any degree of accuracy what the extension will be of the stop-weld pattern. Thus, the tube patterns are not reproducible with a substantial degree of accuracy which presents a serious problem in mass production of like parts.

Therefore, it is a primary object of this invention to provide a laminated sheet material and a method of making the same wherein said laminated material may be used for forming integral tube sheet without the necessity of placing a pattern between the layers.

It is also an object of this invention to provide an integral tube sheet material wherein the tube configuration can be reproduced easily and accurately.

It is another object of this invention to provide integrally bonded laminated sheet materials having a zinciferous metal core layer disposed between aluminous metal layers and to provide a method for making said laminated sheet materials.

It is a further object of this invention to provide a laminated tube sheet wherein an improved bond between the layers is realized.

These and other objects and advantages of the invention will be apparent from the ensuing description of the invention.

By the instant invention, it has been found that a laminated sheet comprised of a metal core member interposed between outer metal layers which are of a metal whose melting point is substantially higher than that of the metal of the core member and which are of substantially greater thickness than said core member can be used with excellent results for making tube systems which are integral with the sheet. Such tube systems can be used for conveying fluids in heat exchange devices, such as evaporator units for household refrigerators and freezers. One distinct advantage of the laminated sheet of the invention is that it can be fabricated in large coils weighing several thousand pounds thereby making the material economical for transporting and amenable to mass production methods of manufacturing tube sheet articles, such as refrigerator evaporators. This is in distinction with the laminated sheet produced by the combination of silk screen printing and roll bonding wherein in practical operation only small sized sheet of the laminated material can be produced.

In the preferred embodiment of the laminated sheet of the instant invention, the core member is of a zinciferous metal, such as high grade zinc, special high grade zinc or a zinc-aluminum alloy, and the outer metal layers are of aluminous metal.

The foregoing has described the invention generally. The following is a more detailed description of the invention with reference being had to the accompanying drawings wherein the laminated sheet and the tube system which can be fabricated therefrom are clearly shown.

Figure 1:
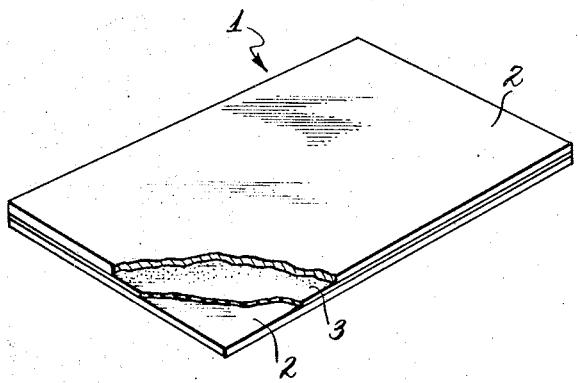
FIGURE 1 is a perspective view of a laminated sheet of the invention drawn partially in section to show the layers comprising the sheet.

Referring to FIGURE 1, there is shown a laminated sheet 1 comprising a zinciferous core layer 3 disposed between and integrally bonded to two layers of aluminous material 2. In the manufacture of the laminated sheet material of the invention a zinciferous core material of high grade zinc, special high grade zinc or a zinc-aluminum alloy is interposed between two aluminum alloy plates to form a sandwich structure. The sandwich structure is heated to a temperature sufficiently high for hot rolling but below the melting point of the core layer metal, after which the structure is subjected to hot rolling to form the laminated sheet material. After hot rolling, the laminated sheet may, if desired, be cold rolled to a final thickness.

Figure 2:
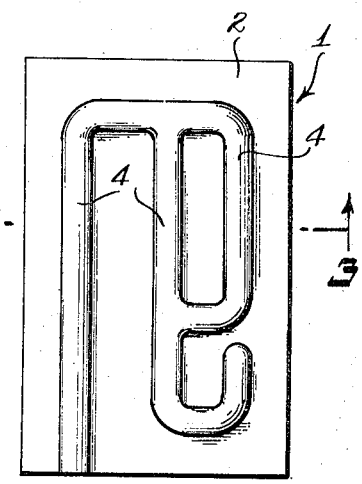
FIGURE 2 is a plan view of a tube sheet system which has been fabricated from the laminated sheet of the invention.
Figure 3:
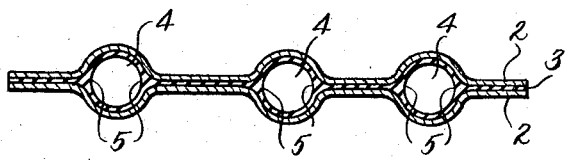
FIGURE 3 is a sectional view taken along the line 3—3 in FIGURE 2.

To produce a tube sheet article having tube passageways 4 shown in FIGURES 2 and 3, a blank of the laminated sheet 1 of the proper dimensions and thickness is placed between two heated platens (not shown). The convolutions of the desired tube pattern are routed out on the faces of the platens. If it is desired to raise the pattern on only one side of the sheet, one platen is left uncut. The platens are heated to above 720° F. and are clamped against the sheet at a pressure of 1500 to 2500 p.s.i. The heat will melt the zinc. A suitable device for introducing fluid under pressure, such as a hollow needle, is inserted at the zinc interface along one edge of the composite sheet, and a fluid pressure of 500 to 1000 lbs. per square inch is applied. The tube pattern is thus inflated. The entire inflating cycle requires approximately 30 seconds. In those areas of the tubed article which are not inflated, the high temperature and high platen pressure produces a brazed joint between the layers of aluminous material 2.

As shown in FIGURE 3, when the zinciferous material 3 melts and the fluid pressure applied, the melted zinciferous material in the tube passageways is distributed throughout the tube passageways 6 and forms a coating of the walls of the tube passageways. In the inflating cycle, the zinciferous material is deposited in greater amount as fillets 5 at the seams or junctures where the aluminous layers 2 are bulged away from each other. This added deposit of zinciferous material is advantageous in the case of heat exchanger devices in that leakage of fluid is prevented.

In producing the laminated sheet of the invention, two plates of aluminum alloy and one sheet of zinciferous material are stacked one on top of the other with the zinciferous sheet in the middle forming a sandwich structure. The zinciferous sheet is preferably somewhat shorter than the aluminum sheets, for example, 2 inches to about 12 inches shorter. The width may be approximately the same as the aluminum alloy plates, however, if desired the width of the zinciferous sheet can be slightly narrower than the aluminum alloy plates. In placing the zinc sheet between the aluminum plates, the front edge of the zinciferous sheet is placed 2 inches to about 12 inches from the front of the aluminum alloy plates. This facilitates bonding, during rolling, at the front edge because aluminum will bond to aluminum more readily than to zinciferous material. It is essential to have good bonding at the forward edge thereby facilitating passage through the continuous rolls without separating or alligatoring. All contacting surfaces should be first cleaned with a solvent, such as benzine. This cleaning can be done in any suitable manner, such as wiping with a piece of cloth. Expensive surface preparation, such as wire brushing and etching, can be, if desired, employed but this is not necessary in order to obtain good bonding between the aluminum alloy and zinciferous material.

The forward end of the sandwich, that is, that end which is destined to go through the rolling mill first, may be then welded and/or riveted together. The sides of the sandwich may also be welded, if desired, at certain areas along the length or may be welded all along the length.

The stack is then placed in a furnace and heated to about 500 to 720° F. After the material is heated to this temperature, it is removed from the furnace and hot rolled without reheating, the first pass of said rolling being at a reduction of total thickness of at least 10% to promote bonding.

After hot rolling, the laminated sheet may be coiled following which it may be cold rolled to the desired thickness. Final annealing is not necessary. The hot rolling temperatures are critical since above about 720° F. the zinciferous material becomes too soft or melts and also a zinc–5% aluminum eutectic, which has a melting point of 719.6° F., may be formed at the interface of the aluminum alloy layers and zinciferous layers. Below about 500° F. the zinc does not satisfactorily bond to the aluminum unless expensive cleaning operations, such as etching and wire brushing, are applied to the contacting surfaces.

When high grade zinc and special high grade zinc are employed as the core layer, the relative thicknesses of the aluminum alloy plates and the zinc sheet should be chosen so that the thickness of the zinc layer in the final laminated sheet is not over 3.5%, preferably not over 2%, of the total thickness of the laminated sheet.

TABLE I.—COMPARATIVE STRENGTH OF Al-Zn BONDS PRODUCED BY ROLLING AT 500° F., 600° F. AND 700° F.

| | 500° F. | | | | | |
| --- | --- | --- | --- | --- | --- | --- |
| Reduction (one pass) | 15% | 25% | 30% | 40% | 50% | 60% |
| High Grade Zinc | (No Bond) | (No Bond) | (No Bond) | Fair | Fair-Good | Good. |
| Special High Grade Zinc | Fair | Fair-Good | Good | Good | Very Good | Very Good. |

| | 600° F. | | | | |
| --- | --- | --- | --- | --- | --- |
| Reduction (one pass) | 15% | 25% | 30% | 40% | 50% |
| High Grade Zinc | Very Poor | Poor | Fair | Good | Very Good. |
| Special High Grade Zinc | Fair-Good | Very Good | Very Good | Very Good | Do. |

| | 700° F. | | | | |
| --- | --- | --- | --- | --- | --- |
| Reduction (one pass) | 10% | 15% | 20% | 25% | 30% |
| High Grade Zinc | Poor | Poor-Fair | Fair | Fair-Good | Good. |
| Special High Grade Zinc | Good | Good | Very Good | Very Good | Very Good. |

In the rolling tests to determine the effect of the grade of zinc on the bonding characteristics, it was found that 99.99+% special high grade Bunker Hill zinc was superior to high grade 99.9+% Horsehead zinc, although the 99.9+% zinc gave a bond that was satisfactory. As indicated in Table I above, the special high grade 99.99+% zinc gave a better bond at less percentage reduction in one pass at a given temperature than did the high grade zinc.

Also, it may be necessary to exercise control in the grade of commercial zinc selected since certain impurities, such as tin, cause some melting at 390° F., even when the amount of tin present is less than 0.05%. The presence of these impurities may cause brittleness (hot shortness) of the zinc at high temperatures.

In employing zinc-aluminum alloys as the core layer, it has been found that it is possible to produce the laminated sheet of the invention wherein the core layer is substantially less than 2% of the final sheet thickness. One purpose for using a zinc-aluminum alloy for the core layer is that the alloy has improved rolling characteristics and mechanical properties when compared to high grade zinc and special high grade zinc. With the use of zinc-aluminum alloys, an alloy composition can be chosen which has a high melting range thereby allowing the temperature of the heated platens used for inflating to be chosen so that the zinc-aluminum alloy only partially melts during the inflating cycle. Therefore, when zinc-aluminum alloys are employed as the core layer of the laminated sheet of the invention, the zinc-aluminum layer of the laminated sheet is not over 2%, preferably not over 1%, of the total thickness of the laminated sheet.

While alloy compositions having a high melting range may be desirable, alloys containing an excessive amount of aluminum require excessively high platen temperatures for inflating. At such high temperatures the outer layers of the composite become soft rendering the composite difficult to remove from the platen without warping. Zinc-aluminum alloy consisting essentially of zinc and up to 60% aluminum may be used as the core layer. However, it is preferred to employ zinc-aluminum alloys consisting essentially of zinc and a maximum of 30% aluminum. Also, beneficial results are obtained by using amounts of aluminum in the zinc-aluminum alloy as low as 0.10%. However amounts of aluminum of at least 1% are preferred.

In the preparation of the zinc-aluminum alloy for the core layer it is preferred that special high grade zinc (99.99% purity) zinc and 99.99% purity aluminum be employed.

Figure 4:
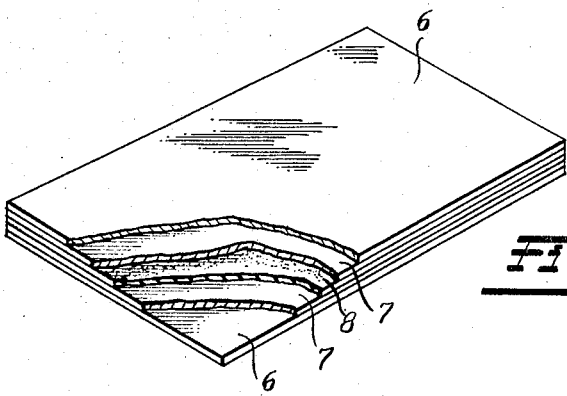
FIGURE 4 is a perspective view of a modification of the laminated sheet shown in FIGURE 1 drawn partially in section to show the layers comprising the modified sheet.

Most of the aluminum alloys are suitable for use as the layer of the laminated sheet which contacts the zinciferous layer. Alloy 1100 (commercial purity aluminum—99.00% aluminum minimum) and alloy 3003 (which has a nominal composition of 1.25% manganese, balance aluminum and normal impurities) have been found satisfactory. Alloys containing magnesium, such as alloy 5005 (which has a nominal composition of 0.80% magnesium, balance aluminum and normal impurities) are not satisfactory for the laminated sheet of the invention when such alloy is in contact with the zinciferous layer. The magnesium alloys will fail during the inflation cycle due to rapid intergranular penetration of the molten zinc along the grain boundaries under the conditions of temperature and stress. Magnesium containing aluminum alloys, such as 5005, can be utilized, however, in producing the laminated sheet of the invention. For example, the magnesium containing alloy can be the outer layers of a five-layer laminated sheet as shown in FIGURE 4 wherein the layers designated 6 are of a magnesium containing alloy whereas the layers designated 7 are of an alloy such as 1100. The zinciferous layer is designated as 8. As the magnesium containing alloy layers are not in contact with the zinciferous layer, the possibility of failure of the magnesium containing alloy will be precluded. This five-layer laminated sheet is advantageous not only because of the increased strength given the laminated sheet by the magnesium containing alloy layers but also the combination aluminum-magnesium-zinc is readily usable as scrap for melting of high strength aluminum alloys such as 7075 (nominal composition of 1.6 copper, 2.5 magnesium, 5.6 zinc, 0.3 chromium, balance aluminum and normal impurities).

It has been found that a laminated sheet in accordance with this invention having more than five layers may be desirable. For example, a sheet of magnesium containing alloy such as 5052 could be clad on both sides with an alloy such as 1100. Two such three layer composites could be rolled with a zinciferous layer in between. It has been found that such a seven layer laminated sheet has less tendency to split apart at the ends after rolling than the above described five layer laminated sheet.

The following examples of producing the laminated sheet material and the ultimate tube sheet articles formed therefrom are indicative of the good bond obtained between the aluminous layers and the zinciferous metal core. These examples are not, however, intended to limit the scope of the invention but merely to show how the laminated sheet of the invention is produced and formed into a tube sheet article.

EXAMPLE I

A sheet of .009" thick special high grade Bunker Hill zinc (99.99% Zn) was interposed between two ⅛" thick 3003 aluminum alloy plates to form a metal sandwich. The individual sheets were cleaned with benzine, then sandwiched together by riveting with aluminum rivets at both ends to prevent slippage and alligatoring. The sandwich was heated to 550° F. and immediately hot rolled three passes to .060 inch thick without reheating. The reductions per pass were .50%, 47% and 13% respectively. The bonding was effected during the first pass and there was no tendency for the layers to separate. The laminated sheet was placed between two platens which had a tube configuration cut in one of the platens and which had been heated to 800 to 850° F. The platens were clamped against the sheet at a pressure of 2000 pounds. A hollow needle was inserted at the zinc interface along one edge and pressure of about 600 p.s.i. applied, thus inflating the tube pattern.

After inflating, the laminated tube sheet was subjected to a bulge test which consists of hydrostatically applying pressure internally to the convolutions until the flat side of the tube can begin to show slight deformation. This laminated tube sheet withstood a pressure of 300 p.s.i. without deforming with eventual rupturing at 1400 p.s.i.

EXAMPLE II

The following describes the fabricating of the laminated sheet of the invention in large coils. The fact that the laminated sheet of the invention can be fabricated in large coils greatly enhances the commercial aspects of the sheet.

Ingots of aluminum alloy 1100 were hot rolled to one and one-half inch plates. The plates were then sheared, stretched to flatness and sawed to finish dimensions of 1.5 inches by 34 inches by 150 inches. The aluminum alloy plates were cleaned with stoddard solvent and wire brushed on the sides which were to contact the zinciferous metal layers.

Two sandwich structures were assembled using special high grade zinc (99.99% Zn) as a core material. Each structure comprised a layer of the zinc of a thickness of 0.060 inch, said zinc layer sandwiched between two plates of the 1.5 inches thick aluminum alloy 1100. Two other sandwich structures were assembled using a zinc-3% aluminum alloy layer of 0.060 inch thickness as the core material, the structures otherwise being the same as those containing the special high purity zinc core layer.

In assembling of the sandwich structures, the zinciferous material (either the special high purity zinc or the zinc–3% aluminum material) was placed upon the bottom aluminum alloy plate 12 inches from one end thereof (the end which was to enter the rolling mill first). The width of the zinciferous material was such as to leave a border of 4 inches between the side edges of the zinciferous sheet and the side edges of the aluminum alloy plate. The top aluminum alloy plate was then placed such that its perimeter was co-extensive with the perimeter of the bottom aluminum alloy plate. The sandwich structure was welded completely across the mill entry end and had alternate 12 inch welded and unwelded sections along the sides. Also, the structure was riveted with two rows of four copper rivets in the entry end of the structure.

After assembly, the structures were heated to 670° F. and held at this temperature for 1.75 hours after which they were hot rolled to a gauge thickness of 0.130 inch, the first pass of said hot rolling being to a reduction of 17%. After being hot rolled to 0.130 inch, the laminated material was rolled into coils. The coils were then cold rolled to 0.060 inch in one pass through a 2 stand tandem mill.

Metallographic inspection of the laminated material revealed that the uniformity of the zinc–3% aluminum alloy core layer was excellent. Although, in the case of the material using special high purity zinc as a core layer, the uniformity of the core layer was not as good as that with the zinc–3% aluminum layer, there were no areas located where the aluminum alloy layers were bonded together.

Inflating tests, similar to those in Example I, were performed on samples taken from the laminated sheet material having the special high grade zinc core and also the material having the zinc–3% aluminum alloy core. Successful results were obtained from all samples used in the inflating tests.

EXAMPLE III

A metal sandwich was made which comprised a sheet of .009 inch thick special high grade Bunker Hill zinc interposed midway between four layers of aluminum alloy. Prior to assembling the metal surfaces were wiped with benzine. The two layers contacting the zinc layers, were 0.012 inch thick 1100 alloy sheet; whereas the two outside layers which did not directly contact the zinc were 0.125 inch thick 5005 alloy sheet. The forward edges of this five layer sandwich were welded together and the sides tack welded in several spots to secure the layers in their position for the rolling process. The sandwich was heated to 675° F. and immediately hot rolled in three passes to .050 inch thick without reheating. The bonds between successive layers were found to be excellent and were effected on the first pass which was to a reduction of 50%. Samples of the bonded composite were then inflated as in Example I with satisfactory results.

EXAMPLE IV

A metal sandwich was made which comprised a sheet of .030″ thick special high grade Bunker Hill zinc interposed midway between six layers of aluminum alloy. Prior to assembling the zinc layer between the layers of aluminum alloy, each set of three layers of aluminum alloys on either side of the zinc layer was fabricated into a sub-composite by assembling a layer of magnesium containing aluminum alloy, 5052 between two sheets of 1100 aluminum alloy and rolling in a conventional cladding operation. Prior to assembling the ultimate composite, the surfaces were wiped with benzine. The two layers contacting the zinc layer and the two outermost layers were 0.075″ thick, 1100 alloy sheet; whereas the two layers sandwiched between the two layers of 1100 alloy sheet were 1.35″ thick, 5052 alloy sheet. The forward edges of this seven layer sandwich were welded together and the sides tack welded in several spots to secure the layers in position for the rolling process. The sandwich was heated to 675° F. and immediately hot rolled in four passes through a single stand reversing mill plus one pass through a five stand tandem mill to .130″ thick without reheating. The bonds between successive layers were found to be excellent and were effected on the first pass which was to a reduction of 25%. Samples of the bonded composite were then inflated as in Example I with satisfactory results.

It will be understood that various changes, omissions and additions may be made to this invention without departing from the spirit and scope thereof as set forth in the appended claims.

What is claimed is:

1. The method of making laminated sheet which comprises the steps of cleaning the contacting surfaces of the individual layers, interposing a core layer of zinc-aluminum alloy consisting essentially of zinc and from about 0.1% to 30% aluminum between aluminous metal layers to form a sandwich structure, said core layer having a thickness such that the thickness of the core layer in the final laminated sheet is not greater than 2% of the total thickness of the laminated sheet, joining the aluminous metal layers together at their forward end, heating the structure to about 500–720° F., hot rolling the heated structure to form a laminated sheet having an integral bond between said core layer and said aluminous metal layers, the bonding of said layers by hot rolling involving a reduction of at least 10%.

2. The method of claim 1 wherein the thickness of said core layer is such that the thickness of the core layer in the final laminated sheet is not greater than 1% of the total thickness of the laminated sheet.

3. The method of claim 1 wherein said hot rolling step is followed by cold rolling of the laminated sheet to the final thickness.

4. The method of making laminated sheet which comprises the steps of cleaning the contacting surfaces of the individual layers, interposing a core layer of zinc-aluminum alloy consisting essentially of zinc and from 1% to 30% aluminum between aluminous metal layers to form a sandwich structure such that the forward edge of said core layer falls short of the forward edges of said aluminous metal layers, said core layer having a thickness such that the thickness of the core layer in the final laminated sheet is not greater than 2% of the total thickness of the laminated sheet, joining the aluminous metal layers together at their forward end, heating the structure to about 500–720° F., hot rolling the heated structure to form a laminated sheet having an integral bond between said core layer and said aluminous metal layers, the bonding of said layers by said hot rolling involving a reduction of at least 10%, and thereafter cold rolling the laminated sheet to the final thickness.

5. The method according to claim 4 wherein said zinc-aluminum alloy layer contains about 1% aluminum.

References Cited

UNITED STATES PATENTS

| 2,779,086 | 1/1957 | Rieppel et al. | 29—157.3 X |
| 2,987,814 | 6/1961 | Singleton et al. | 29—475 X |
| 3,045,330 | 7/1962 | Johnson et al. | 29—494 |
| 3,046,640 | 7/1962 | Singleton | 29—197 |
| 3,166,837 | 1/1965 | Frick et al. | 29—475 X |

JOHN F. CAMPBELL, *Primary Examiner.*

L. J. WESTFALL, *Assistant Examiner.*